United States Patent Office 3,049,087
Patented Aug. 14, 1962

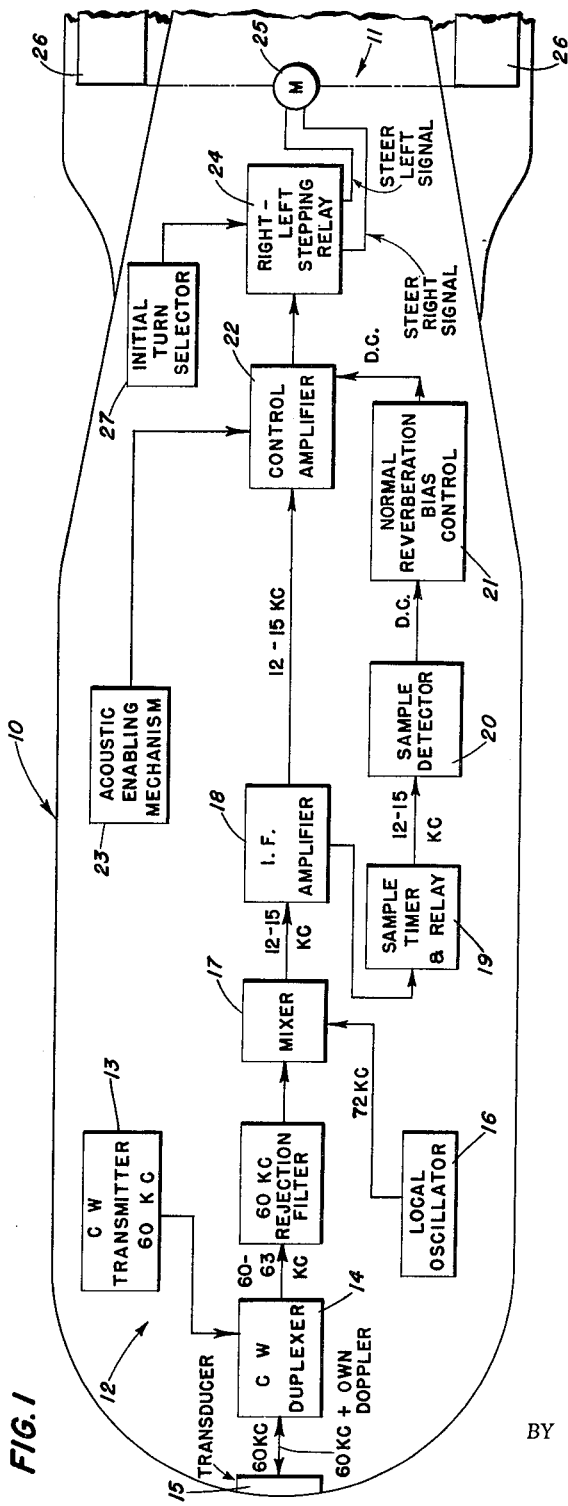
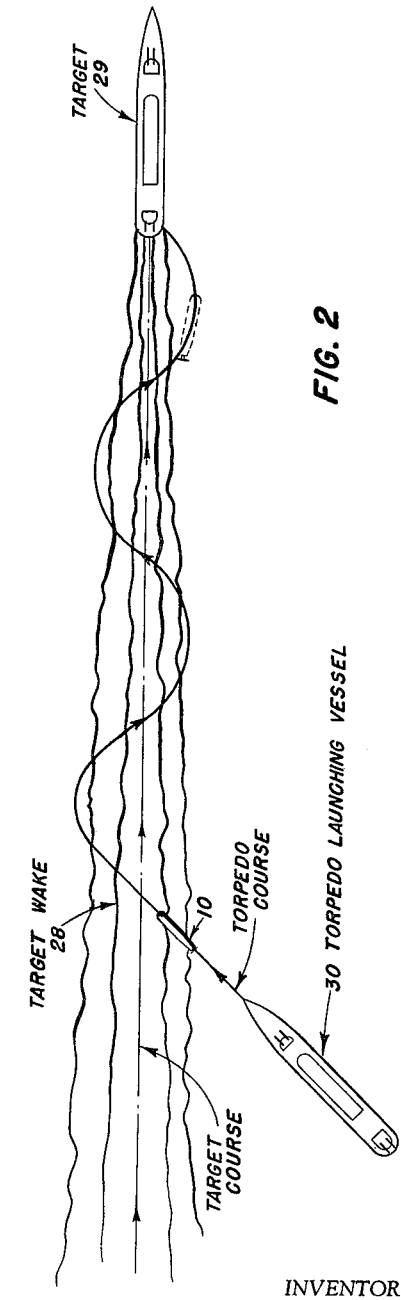

3,049,087
WAKE RESPONSIVE TORPEDO GUIDANCE SYSTEM
Charles P. Conley and Arthur Nelkin, Pittsburgh, Pa., assignors, by mesne assignments, to the United States of America as represented by the Secretary of the Navy
Filed June 27, 1952, Ser. No. 295,884
7 Claims. (Cl. 114—23)

The invention relates to improvements in automatic electric steering systems and more particularly to improved apparatus for automatically steering a torpedo toward a water-borne moving target along its wake.

The wake of a water-borne moving target generally constitutes a source of spurious information and disturbing signals interfering with the operation of active marine torpedo guiding systems. Torpedoes equipped with active homing systems can be misdirected due to various disturbances produced by their passing through the wake. An important object of the present invention is to provide a torpedo guiding system that not only does not suffer from this defect, but actually utilizes the wake's disturbance as a means for guidance.

Another object of the invention is the provision of an active missile guiding system not requiring a highly directional transducer or transducer lobing system for direction sensing.

A further object is to provide an active torpedo guiding system of the character described permitting firing of the torpedo toward the target wake from either side.

Other objects and many of the attendant advantages of this invention will be readily appreciated as the same becomes better understood by reference to the following detailed description when considered in connection with the accompanying drawings wherein:

FIG. 1 is a block diagrammatic view of the missile guiding system applied to a submarine torpedo.

FIG. 2 is a diagrammatic plan view illustrating the steering action of the torpedo in pursuing a water-borne moving target along its wake.

In the drawings which for the purpose of illustration show only a preferred embodiment of the invention, the numeral 10 generally designates a submarine automobile torpedo equipped with the automatic electric steering system 11 show in FIG. 1.

A transmitter 12 including a conventional C.W. (continuous-wave) transmitter 13 and duplexer 14 projects supersonic compressional wave energy underwater at a frequency of 60 kc. from a transducer 15 located in the torpedo head. These supersonic waves upon being reflected back as echoes, consisting principally of reverberation, mechanically energize the transducer 15 now acting as a hydrophone to generate electrical reverberation signals at a frequency of 60–63 kc. corresponding to the 60 kc. frequency transmitted plus an incremental Doppler frequency due to torpedo motion.

These electrical reverberation signals are processed by a conventional superheterodyne receiver including a local oscillator 16 operating at a frequency of 75 kc., a mixer 17 and an intermediate frequency amplifier 18. Transmitter leak-through to the receiver is eliminated by a 60 kc. rejection filter. The 12–15 kc. difference frequency output of the receiver amplifier 18 is fed to an initially closed time delay relay 19 which, together with a normal reverberation sample detector 20 and a reverberation controlled gain circuit 21 functions to sample reverberation strength in open water and establish a proportional bias on a suitable control amplifier 22. After the torpedo has proceeded far enough for its acoustic enabling mechanism 23 to function, the initially closed time delay relay 19 has opened to remove the receiver amplifier output from the sample detector 20, leaving the normal reverberation bias on the control amplifier 22.

If the receiver output thereafter exceeds the normal reverberation level for which the normal reverberation bias is established, a stepping relay 24 is actuated and a reversible steering motor 25 is energized to impart right or left turn to the rudders 26 depending on the direction chosen by an initial turn selector 27. The receiver output rises above the normal reverberation level only when the torpedo 10 enters the wake 28 of the target 29, and the stepping relay 24 is so connected that, after the first turn, alternately opposite turns are signalled at successive entries of the wake.

The principle of operation of the steering system is clear from an inspection of FIG. 2. The torpedo is fired from a torpedo launching vessel 30 toward the wake 28 of the target 29 after the direction of the first turn to be made by the torpedo is selected by the fire control officer. In the example shown in FIG. 2, a right turn is selected as the first turn to be made on crossing the wake. When the torpedo passes into the wake, a large increase in reverberation strength occurs. This momentarily energizes the stepping relay 24 causing it to signal the right turn selected in the present instance. Thereupon the torpedo rudder is thrown hard right and holds in this position until the torpedo again encounters the wake. On this second encounter with the wake, a turn is signalled in the direction opposite that first chosen. Then the torpedo, by a zig-zag manner of pursuit, follows the target's wake until a contact or influence exploder detonates it at the target.

Obviously many modifications and variations of the present invention are possible in the light of the above teachings. It is therefore to be understood that within the scope of the appended claims the invention may be practiced otherwise than as specifically described.

What is claimed is:
1. An automatic wake-sensing and torpedo-steering system for directing a torpedo, having steering gear, along a sinuous wake-crossing course toward a moving waterborne target, comprising electro-acoustic means for detecting passage of the torpedo into the wake, steering gear control means operative in response to said detection of wake entry to cause the torpedo to execute a turn in response to initial wake entry and to cause the turn direction of said torpedo to be reversed in response to each subsequent entry into the wake, said turns being of radius to carry the torpedo through and back toward said wake, and means for presetting said steering gear control means to cause the torpedo to turn toward the target on initial wake entry.

2. A system as in claim 1 wherein said electro-acoustic means includes transmitter means for projecting acoustic energy underwater and receiver means for detecting resultant water reverberation indicative of said passage of the torpedo into the wake, and said steering gear control means is operative in response to the detection by said receiver means of water wake reverberation having a strength in excess of open water reverberation strength.

3. A system as in claim 2 wherein said torpedo steering gear control means includes a control amplifier actuable by said receiver output, and a steering gear reversing relay actuable by the output signals from said amplifier, said relay becoming energized to reverse the torpedo steering gear each time the input signal thereto exceeds a predetermined value, and bias control means responsive to the initial output of said receiver for establishing a threshold bias in said amplifier such that the maximum output signals thereof for open-water reverberation will be weaker than said predetermined value.

4. A system as in claim 3, including means for maintaining said threshold bias, means for rendering said bias control means inoperable after a preset period of time, means for rendering said amplifier operative only after a preset period of time.

5. An automatic sensing and steering system for directing a torpedo equipped with reversibly motorized steering gear toward a water-borne moving target leaving a wake, including a transmitter of underwater acoustic energy, an electro-acoustic transducer for reception of water reverberation energy induced by said transmitted acoustic energy and adapted to deliver corresponding reverberation signals, a receiver for said reverberation signals and adapted to supply amplified output signals corresponding thereto, a control amplifier actuable by said receiver output signals, gain control means initially responsive to said receiver output signals and adapted to establish a control threshold for said amplifier, a relay actuable in response to said control amplifier output in excess of said control threshold to reverse said steering gear, a time delay relay for disconnecting said receiver output signals from said gain control means upon the expiration of a reverberation sampling time period, and means rendering said control amplifier initially inoperable and subsequently enabling said amplifier.

6. An automatic sensing and steering system as in claim 5, wherein said gain control means includes a reverberation sample detector and normal reverberation bias control adapted to supply a bias voltage, for said amplifier, of suitable magnitude to set said control threshold at a level which enables actuation of said relay in response only to reverberation signal strength exceeding that of open-water reverberation signals.

7. A method for directing a torpedo toward a moving water-borne target generating a wake, comprising the steps of launching the missile along a predetermined course which intercepts the target wake, transmitting underwater acoustic energy from the missile, detecting water reverberation signals induced by said transmitted acoustic energy, establishing the normal level of said signals due to reverberation in open water, causing the torpedo to execute a turn toward the target when said signals first exceed said normal level, and causing the turn direction to be reversed each time the level of said signals exceeds said normal level upon subsequent entry into the target wake, said turn being of radius to carry the torpedo through and back toward said wake.

References Cited in the file of this patent

UNITED STATES PATENTS

| | | |
|---|---|---|
| 1,861,215 | Hammond | May 31, 1932 |
| 2,409,632 | King | Oct. 22, 1946 |
| 2,431,854 | Wood | Dec. 2, 1947 |
| 2,621,243 | Sunstein | Dec. 9, 1952 |